United States Patent [19]
Schetter

[11] Patent Number: 5,339,637
[45] Date of Patent: Aug. 23, 1994

[54] TUBE SEGMENT, IN PARTICULAR FLAME TUBE, WITH A COOLED SUPPORT FRAME FOR A HEATPROOF LINING

[75] Inventor: Bernhard Schetter, Mülheim a.d. Ruhr, Fed. Rep. of Germany

[73] Assignee: Siemens Atkiengesellschaft, Munich, Fed. Rep. of Germany

[21] Appl. No.: 4,664

[22] Filed: Jan. 14, 1993

Related U.S. Application Data

[63] Continuation of Ser. No. 731,522, Jul. 17, 1991, abandoned.

[51] Int. Cl.⁵ .............................................. F02C 1/00
[52] U.S. Cl. ........................................ 60/752; 60/753; 431/351; 431/352; 431/353
[58] Field of Search ................ 60/752, 753; 431/351, 431/352, 353

[56] References Cited

U.S. PATENT DOCUMENTS

| | | |
|---|---|---|
| 1,541,449 | 6/1925 | Wagner . |
| 4,441,324 | 4/1984 | Abe et al. ............................ 60/753 |
| 4,655,044 | 4/1987 | Dierberger et al. ................. 60/753 |
| 4,838,031 | 6/1989 | Cramer ............................... 60/753 |
| 5,027,604 | 7/1991 | Krueger ............................... 60/753 |

FOREIGN PATENT DOCUMENTS

| | | | |
|---|---|---|---|
| 0136071 | 4/1985 | European Pat. Off. | ............. 60/753 |
| 0829531 | 12/1951 | Fed. Rep. of Germany . | |
| 1021647 | 12/1957 | Fed. Rep. of Germany . | |
| 1173734 | 7/1964 | Fed. Rep. of Germany . | |
| 2140401 | 3/1973 | Fed. Rep. of Germany | ........ 60/753 |
| 2523449 | 3/1981 | Fed. Rep. of Germany . | |
| 2552860 | 4/1985 | France . | |
| 59-15728 | 1/1984 | Japan . | |
| 59-417163 | 3/1984 | Japan . | |
| 8912789 | 12/1989 | PCT Int'l Appl. . | |
| 0602149 | 5/1948 | United Kingdom . | |

*Primary Examiner*—Richard A. Bertsch
*Assistant Examiner*—Howard R. Richman
*Attorney, Agent, or Firm*—Herbert L. Lerner; Laurence A. Greenberg

[57] ABSTRACT

A tube assembly, such as a flame tube for a gas turbine plant, includes a tube segment having an inner region for guiding a hot gas in one flow direction. A heat shield faces toward the inner region and includes a plurality of bricks being disposed side by side. At least one metal support frame supports the heat shield. The support frame has a plurality of conduits for supplying a cooling gas and a lip encompassing the tube segment and substantially covering the conduits toward the inner region leaving a slit for conducting the cooling gas from the conduits past the lip to the inner region.

15 Claims, 1 Drawing Sheet

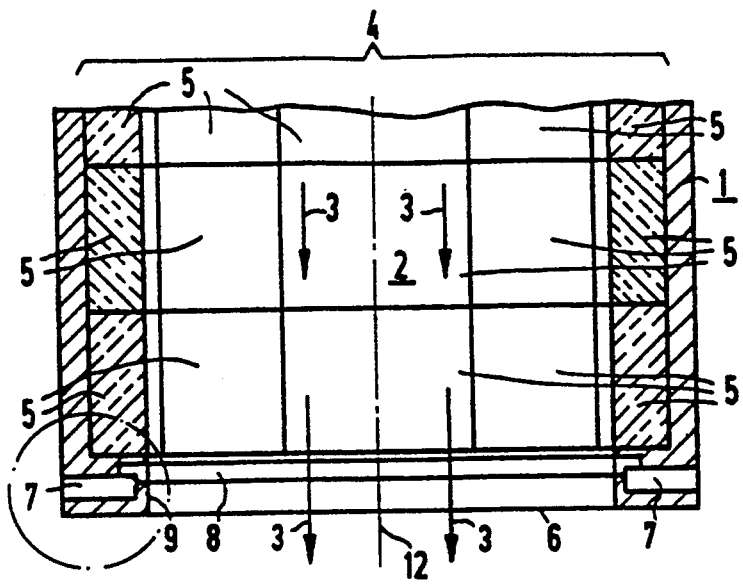
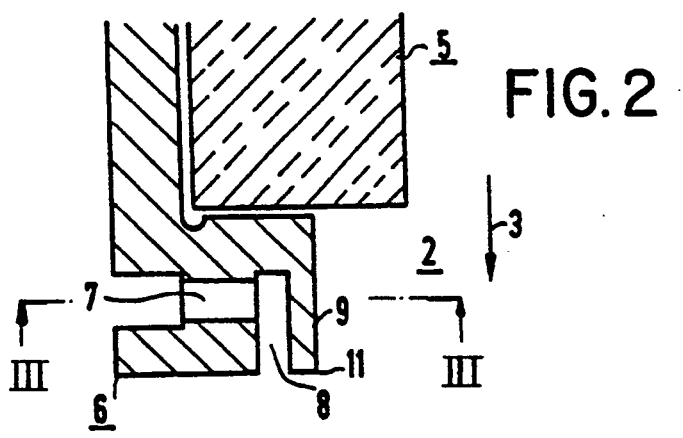
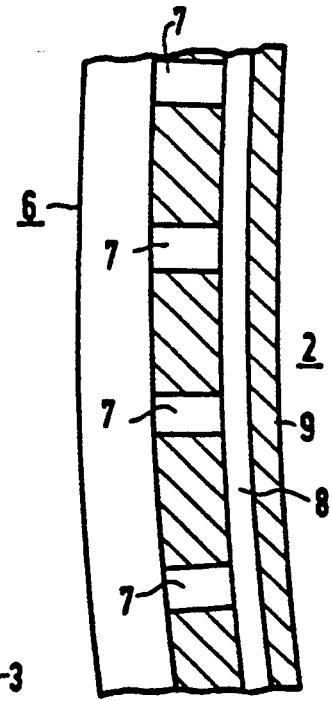
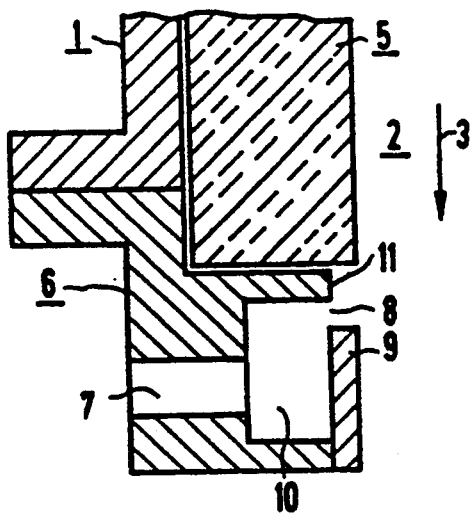
FIG. 1
FIG. 2
FIG. 3
FIG. 4

TUBE SEGMENT, IN PARTICULAR FLAME TUBE, WITH A COOLED SUPPORT FRAME FOR A HEATPROOF LINING

This application is a continuation of application Ser. No. 731,522, filed Jul. 17, 1991, now abandoned.

The invention relates to a tube segment having an inner region for guiding a hot gas in one flow direction, and a heat shield facing toward the inner region and including a plurality of bricks or stones disposed side by side.

Such tube segments have manifold uses as flame tubes in combustion plants, in particular in gas turbine plants. German Published, Prosecuted Application DE-AS 1 173 734 and German Patent DE 25 23 449 C3 describe such tube segments with heat shields, in which each heat shield includes a plurality of bricks that are disposed side by side, and the bricks are each clamped to retainers on two opposed sides. Fastening the bricks at right angles to the clamping direction is not explicitly described. If the tube segment is vertical or at least inclined, then support of the bricks on a suitable support frame is necessary. In order to provide a substantially horizontal tube segment, the heat shield must be closed at each end with a suitable frame and supported. As a rule, such a support frame is made of metal. If it is to withstand the same extent of thermal strains in operation as the heat shield withstands, it must be adequately cooled.

In order to cool a support frame, the frame can be provided with conduits in the form of bores or the like, through which a cooling gas (as a rule, in the case of the flame tube, the gas is some of the combustion air furnished to the flame tube) is intended to flow. Proposals along these lines can be found in German Patent DE 25 23 449 C3, for example. The fact that the cooling air flows in the form of individual streams into the inner region of the tube segment is often problematic in such a device. It causes turbulence in the hot gas flow and as a result, hot gas can be swirled against the surface toward the inner region of the support frame, thus damaging the frame. The hot flow itself is sometimes impaired by cooling gas that flows crosswise. Some remedy can be provided by orienting the conduits at an angle relative to the surface of the support frame, rather than perpendicularly thereto. However, that is only feasible at great expense, and it is also unsatisfactory in its effect, at least if angles that can still be achieved at reasonable expense are chosen.

It is accordingly an object of the invention to provide a tube segment, in particular a flame tube, with a cooled support frame for a heatproof lining, which overcomes the hereinafore-mentioned disadvantages of the heretofore-known devices of this general type and which creates a tube segment lined with a heat shield, that has at least one support frame for the heat shield and can be cooled efficiently and with maximum economy, and in which impairment of the hot gas flow in the tube segment and the attendant danger that filaments of hot gas will strike the support frame, are avoided.

With the foregoing and other objects in view there is provided, in accordance with the invention, a tube assembly comprising a tube segment having an inner region for guiding a hot gas in one flow direction, such as a vertical flow direction, a heat shield facing toward the inner region and including a plurality of bricks being disposed side by side, and at least one metal support frame supporting the heat shield, the support frame having a plurality of conduits for supplying a cooling gas and a lip encompassing the tube segment and substantially covering the conduits toward the inner region leaving a slit for conducting the cooling gas from the conduits past the lip to the inner region.

According to the invention, the tube segment has a support frame with an encompassing slit, in which the quantities of cooling gas flowing through the conduits collect, resulting in a uniform, slow flow which finally enters the inner region that carries the hot gas. This kind of slow flow is capable of forming a proper film of cooling gas over the support frame. The film securely shields the support frame, yet does not impair the hot gas flow and causes no turbulence. Since the streams of cooling fluid carried through the conduits strike the lip before entering the inner region, they are slowed down and can coalesce, forming a uniform film of cooling fluid. Effective impact cooling of the thermally highly strained regions of the support frame is also attained.

In accordance with another feature of the invention, the support frame is provided with a collecting chamber, or a configuration of plural collecting chambers, encompassing the tube segment, the conduits discharge into this chamber or chambers, and the cooling gas is carried from them through the slit into the inner region. This is done in order to attain particularly good coalescence of the streams of cooling gas leaving the conduits. The cooling gas streams can be slowed down in the collecting chamber, enabling a particularly uniform film to form over the entire periphery of the tube segment.

In accordance with a further feature of the invention, the slit is aligned approximately parallel to the flow direction. This produces a cooling gas flow that is largely parallel or anti-parallel to the flow direction and has as few speed components as possible perpendicularly to the flow direction. Moreover, the region of the support frame that is thermally strained the most, namely the region directly oriented toward the inner region, is efficiently cooled. Effective impact cooling is attained by means of the streams of cooling gas from the conduits, by constructing the region that is most severely strained thermally as a thin lip.

In accordance with an added feature of the invention, the slit is located in the support frame in such a way that it discharges into the inner region in the vicinity of a leading end of the support frame. In this way, a film of cooling gas that substantially covers the entire support frame and thus shields it from the hot gas can be attained.

In accordance with an additional feature of the invention, the tube segment is approximately straight with respect to an axis running parallel to the flow direction.

In accordance with yet another feature of the invention, the tube segment is axially symmetrical, and in particular cylindrical, with respect to the axis. This provides an embodiment of the invention that is particularly simple and economical to manufacture.

In accordance with a concomitant feature of the invention, the tube segment according to the invention is a flame tube for a gas turbine plant. The tube segment can be very severely strained thermally and additionally requires only slight cooling, thus offering great freedom in constructing the gas turbine system.

Other features which are considered as characteristic for the invention are set forth in the appended claims.

Although the invention is illustrated and described herein as embodied in a tube segment, in particular a flame tube, with a cooled support frame for a heatproof lining, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a fragmentary, diagrammatic, partly sectional view of a tube segment with a heat shield and a support frame according to the invention;

FIG. 2 is a fragmentary, sectional, enlarged view of the left-hand bottom portion of FIG. 1;

FIG. 3 is a fragmentary, sectional view taken along the line III—III in FIG. 2; and FIG. 4 is a fragmentary, sectional view of a particularly advantageous embodiment of the tube segment according to the invention with a heat shield and a support frame.

Referring now to the figures of the drawing in detail and first, particularly, to FIG. 1 thereof, there is seen a tube assembly or flame tube having a straight tube segment or piece 1 with an inner region 2, through which a hot gas is to be carried in a flow direction 3 that is represented by arrows. The tube segment 1 is approximately straight with respect to an axis 12 extending parallel to the flow direction 3. The tube segment 1 is lined with a heat shield 4, which includes bricks or stones 5 that are disposed side by side and one above the other. These bricks are secured in the tube segment 1 with suitable fastening means. Since the type of fasteners and their manipulation are found in the prior art as well, the fasteners have not been shown herein, for the sake of simplicity. The lower end of the tube segment 1 has a support frame 6, on which the bricks 5 are supported. This support frame 6 is formed directly onto the tube segment 1, in the present example. Naturally, it can also be manufactured separately, as needed, and later joined to the rest of the tube segment 1 in any manner that appears suitable.

The support frame 6 is formed of metal, like the rest of the tube segment, and therefore can withstand less thermal strain than the actual heat shield 4. Accordingly, the support frame 6 is given special cooling. Conduits 7 are formed in the outer periphery of the support frame 6, through which a cooling fluid, namely cooling air, can be carried into the inner region 2 of the tube segment 1. However, in accordance with the invention, the conduits 7 do not discharge directly into the inner region 2. Instead, the conduits 7 discharge in the interior of the support frame 6 into a slit 8 encompassing the tube segment 1, which finally opens toward the inner region 2 of the tube segment 1. The slit 8 is formed by a lip 9 encompassing the tube segment 1. In this slit 8, streams of cooling air emerging from the conduits 7 can coalesce to form a slow, uniform film of cooling air, which spreads protectively over the support frame 6 and assures reliable thermal shielding as it emerges from the slit 8. Toward the inner region 2 of the tube segment 1, the conduits 7 are substantially covered by the lip 9 of the support frame 6. The streams of cooling air guided through the conduits 7 strike this lip 9 and thus effect an additional impact cooling of the region of the support frame 6 that is directly oriented toward the hot gas in the inner region 2.

Another feature of the support frame 6 along the lines of the invention is shown in FIGS. 2 and 3. For the sake of simplicity, reference will be made to both of these figures at once. Once again, a support frame 6 is provided for supporting bricks 5 and is coolable by passing cooling air through conduits 7 into a slit 8 that encompasses the tube segment 1 and carrying it from there into the inner region 2. In order to ensure maximum avoidance of creating turbulence in the hot gas flow carried through the inner region 2, the slit 8 does not open in a direction at right angles to the flow direction 3 but rather parallel to it. This enables further slowing down of the film of cooling air and promotes its spread onto the structure to be cooled, namely the lip 9. In the example of FIG. 2, the hot gas flow would be carried first along the support frame 6, and only then along the bricks 5. Correspondingly, the slit 8 opens into the inner region 2 in the vicinity of a leading end 11 of the support frame 6, so that the film of cooling air emerging from the slit 8 can spread as completely as possible between the support frame 6 and the hot gas flow.

A further feature of the invention is shown in FIG. 4. In FIG. 4, a support frame 6 is shown as a separate component part, which is flanged to the other parts of a tube segment 1. Cooling of the support frame 6 is effected by cooling air that is carried through conduits 7 and a slit 8 into an inner region 2. Advantageously, the slit 8 again opens into the inner region 2 in the vicinity of the leading end 11 of the support frame 6, so that a film of cooling air that covers the support frame 6 as completely as possible and flows in the flow direction 3, is attained. As a special feature, the support frame 6 has a collecting chamber 10 encompassing the tube segment 1 between the conduits 7 and the slit 8. The cooling air flows into the chamber 10 from the conduits 7 before being released into the inner region 2 through the slit 8. The collecting chamber 10 serves to make the flow of cooling air leaving the slit 8 even more uniform. Naturally, it may be made in multiple parts instead. The slit 8 is formed between the leading end 11 and a lip 9. The lip is provided with effective impact cooling due to the cooling fluid emerging from the conduits 7. However, in the illustrated embodiment, the lip 9 cannot be manufactured in one piece with the support frame, but instead must be connected to the support frame 6 as a separate component. Although this has a certain disadvantage from a production standpoint, it nevertheless enables the selection of different materials for the support frame 6. The part of the support frame 6 containing the conduits 7 may be made of an inexpensive, easily machined material, such as ferritic steel, while a material that can withstand especially severe strains, such as a high-temperature-proof nickel alloy, can be used for the lip 9. Thus the expense for making separate parts can sometimes be offset by selecting less expensive materials for some of them.

The tube segment lined with a heat shield according to the invention can withstand especially severe thermal strains and can carry a largely undisturbed flow of hot gas. It is especially well-suited for use in combustion systems, such as in gas turbine combustion chambers.

I claim:

1. A flame tube for a gas turbine plant, comprising a tube segment having an axis and an inner region for guiding a hot gas in one flow direction substantially parallel to said axis, a heat shield facing toward said inner region and including a plurality of bricks being disposed side by side, and at least one metal support frame supporting said heat shield, said support frame being disposed adjacent said heat shield as seen along the flow direction, and said support frame having a plurality of conduits for supplying a cooling fluid and a lip disposed directly adjacent said inner region and surrounding said inner region, said lip being means for slowing a flow of the cooling fluid from said conduits and for causing a substantially uniform flow of the cooling fluid past said lip to said inner region.

2. The flame tube according to claim 1, wherein said lip extends approximately parallel to said axis.

3. The flame tube according to claim 1, wherein said support frame has a collecting chamber encompassing said axis and conducting the cooling gas from said conduits to said lip.

4. The flame tube according to claim 1, wherein said support frame has a leading end against which the hot gas can flow, and said lip discharges into said inner region at said leading end.

5. The flame tube according to claim 1, wherein said tube segment is approximately straight with respect to said axis.

6. The flame tube according to claim 5, wherein said tube segment is axially symmetrical with respect to said axis.

7. The flame tube according to claim 6, wherein said tube segment is cylindrical.

8. In a tube assembly with a tube segment having an inner region for guiding a hot gas in a given flow direction, a heat shield structure lining the tube segment, comprising a plurality of bricks disposed side by side and facing toward the inner region, and a metal support frame supporting said plurality of bricks, said support frame having a plurality of conduit means formed therein for supplying a cooling fluid for cooling said metal support frame and lip disposed directly adjacent the inner region, said lip being means for causing a substantially uniform flow of the cooling fluid from said conduits to the inner region.

9. A tube assembly, comprising a tube segment having an axis and an inner region for guiding a hot gas in one flow direction substantially parallel to said axis, a heat shield facing toward said inner region and including a plurality of bricks being disposed side by side, and at least one metal support frame supporting said heat shield, said support frame being disposed adjacent said heat shield as seen along the flow direction, and said support frame having a plurality of conduits for supplying a cooling fluid in a lip disposed directly adjacent said inner region and surrounding said inner region, said lip being means for slowing a flow of the cooling fluid from said conduits and for causing a substantially uniform flow of the cooling fluid past said lip to said inner region.

10. The tube assembly according to claim 9, wherein said slit extends approximately parallel to the flow direction.

11. The tube assembly according to claim 9, wherein said support frame has a collecting chamber encompassing said axis and conducting the cooling gas from said conduits to said slit.

12. The tube assembly according to claim 9, wherein said support frame has a leading end against which the hot gas can flow, and said slit discharges into said inner region at said leading end.

13. The tube assembly according to claim 9, wherein said tube segment is approximately straight with respect to said axis.

14. The tube assembly according to claim 13, wherein said tube segment is axially symmetrical with respect to said axis.

15. The tube assembly according to claim 14, wherein said tube segment is cylindrical.

* * * * *